April 20, 1965 B. J. ARNETT 3,179,269
APPARATUS FOR UNLOADING CARTONS AND REGIMENTING
THE ARTICLES UNLOADED THEREFROM
Filed May 4, 1959 6 Sheets-Sheet 1

INVENTOR.
BOYD J. ARNETT
BY
Paul B. Fike
PATENT AGENT

INVENTOR.
BOYD J. ARNETT.
BY
PATENT AGENT

United States Patent Office 3,179,269
Patented Apr. 20, 1965

1

3,179,269
APPARATUS FOR UNLOADING CARTONS AND REGIMENTING THE ARTICLES UNLOADED THEREFROM
Boyd J. Arnett, 1914 Monroe St., Santa Clara, Calif.
Filed May 4, 1959, Ser. No. 810,666
15 Claims. (Cl. 214—304)

The present invention relates to the art of handling cartons and their contents, and more particularly to apparatus for unloading cartons and regimenting the articles unloaded from such cartons.

Canners and bottlers are normally supplied with empty cans or bottles packed in cartons of appropriate size wherefore prior to filling operations the cans or bottles must be removed from the cartons and regimented in a desired physical relation, usually single-file, for entry into the filling apparatus. Commercially available filling machines can handle upwards of 200 cans or bottles per minute, but previously available carton unloading and can or bottle regimenting equipment has operated at much lower rates so that such filling machines have been restricted to operation considerably below their maximum rated capacity.

Accordingly, it is a general object of the present invention to provide a carton unloading and article regimenting apparatus enabling relatively high capacity operation to be achieved over extended periods of time.

It is a feature of the invention to provide a carton unloading and article regimenting apparatus wherein both the carton and unloaded articles are conveyed at progressively higher speeds so that, regardless of the rate of operation, accumulation of cartons and/or articles is precluded thus to remove theoretical limitations on operating capacity and to avoid a major cause of jamming.

More specifically, it is a feature to provide an article regimenting apparatus wherein, as successive rows of articles are regimented into single-file relation, acceleration is provided to the extent requisite to maintain separation of the articles in the direction of motion.

In the case of bottles, which are obviously quite frangible, a honeycomb liner is inserted into each carton to form individual compartments within which individual bottles are placed so as to avoid breakage. In previous unloading methods and apparatus, the removal of the bottles from the carton has frequently been accompanied by a simultaneous removal of this liner which must thereafter be manually reinserted before the bottles can be replaced into such carton after the filling operation has been completed.

A consequent specific feature of the invention is to provide apparatus for unloading bottles from cartons having honeycomb liners therein which effectively precludes removal of the liner during withdrawal of the bottles from the carton.

Additional problems have been encountered in the unloading and regimenting of bottles or other articles particularly when such articles are neither square nor circular in cross-section, since if bottles of another shape, such as the conventional "flat" bottles, are to be unloaded and regimented, a precise alignment and orientation must be achieved.

Therefore, it is an additional feature of the invention to provide a carton unloading and article regimenting apparatus wherein alignment and orientation are initially achieved during the unloading operation and are maintained with precision during the regimenting operation.

A feature of the invention relating to the specific apparatus to be disclosed hereinafter is its adjustability, enabling accommodation of cartons as well as bottles or other articles of various sizes and shapes.

2

An additional important feature again relating to the apparatus is the compactness thereof so that although high capacity operation is enabled, yet a minimum floor space is requisite.

Yet another feature of the apparatus is the arrangement for frictionally propelling the articles and cartons in contradistinction to a positive propulsion so that jamming and the resultant interruption of operation or actual breakage of the articles is precluded.

Another feature of the invention and relating specifically to the apparatus is the provision of a particularly simple yet effective form of flap-opening section for the cartons, many of the elements of the section serving dual functions.

An additional feature of the apparatus relates to the effective form of carton grasping and unloading arrangement which, as mentioned hereinbefore, assures retention of the honeycomb liner in the carton and provides for the egress of the articles from the carton in a gentle fashion so that breakage is precluded and good orientation and alignment of the unloaded articles is retained.

In further relation to the orientation and alignment of the articles, it is a feature of the invention to provide an effective arrangement for assuring the maintenance of precise orientation and alignment of the articles as they enter and pass through the mentioned article-regimenting section of the apparatus.

A feature directly relating to such regimenting apparatus is its structural and operational arrangement which enables extremely high capacity operation even with articles constructed with glass, yet substantially precludes breakage thereof.

These as well as other objects and features of the invention will become more apparent from a perusal of the following description of a preferred form of apparatus illustrated in the accompanying drawings, wherein.

Figures 1, 2:
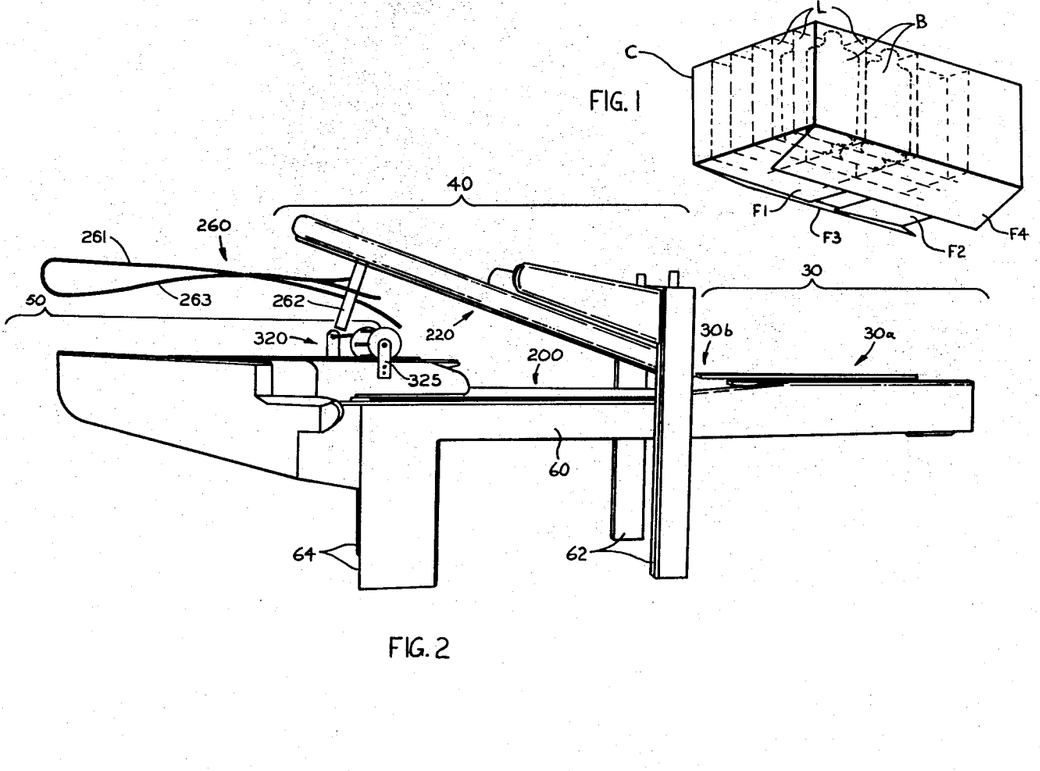
FIG. 1 is a perspective view of an inverted carton, and phantom illustration of its interior construction and glass bottles packed therein, such carton and bottles being typical of those to which the apparatus of the present invention is applicable.
FIG. 2 is a side perspective view of the entire apparatus.

To enable greater understanding, the apparatus will be described in operative relation to a particular form of carton and article, those shown in FIG. 1. The carton C is of generally rectangular shape and is formed by cardboard sections of sufficient strength to retain the general shape of the carton, but allowing a certain amount of distortion upon application of external forces. The carton C is shown in an inverted position which is that in which it is disposed for instigation of operation in accordance with the present invention. In such inverted position, the undersurface of the carton C is formed by four unsealed flaps, F1, F2, F3, and F4, the end flaps F1 and F2 being folded first to form the inner flaps and the side flaps, F3 and F4 being folded thereover to form the outer flaps on the carton undersurface. Contained in the carton C are a plurality of bottles B of generally flat shape and having a reduced neck portion which is threaded adjacent its upper end for reception of a closure cap (not shown). The bottles B are packed in the carton in inverted position so that when the carton C is, in turn, inverted, as shown in FIG. 1, the bottles B then rest in an upright position. Since the bottles are of a frangible nature, a honeycomb liner L of cardboard is inserted into the box to form individual compartments for the bottles and preclude contact therebetween and consequent breakage. Normally, this liner L is merely pushed into the carton C and can be manually withdrawn at any time.

In accordance with the present invention, a carton C loaded with the bottles B, after placement in the inverted disposition illustrated in FIG. 1, is caused to undergo the following steps which ultimately result in the separation of the bottles from the carton and subsequent regimentation of the bottles for delivery to a filling station or the like. It will be clear that other bottles, cans or articles can be unloaded and regimented by the same steps.

Generally, the carton C, in its inverted disposition, is moved along a predetermined path while supported on all or portions of its undersurface. During such movement, the side flaps F3, F4 and then the trailing end flap F2 are successively opened but the leading end flap F1 remains closed to retain the liner L within the carton C.

As movement along such predetermined path continues, the opposite sides of the carton C are resiliently grasped and the carton is gradually lifted so that the leading end flap F1 can now gradually swing open and the bottles B in turn can emerge from their individual compartments within the carton. Since the bottles B gradually and therefore gently emerge from the carton, their aligned and oriented disposition as determined by the containing compartments is preserved and the bottles are thereafter frictionally propelled in their upright aligned and oriented disposition in a plurality of successive, parallel rows.

Each successive row of aligned and oriented bottles B is thereafter propelled along a continuation of such predetermined path at a higher speed so that successive rows become separated in the direction of motion and each separated successive row is finally received and propelled at yet a higher speed in a direction transverse to the previous direction of motion so that aligned, oriented, single-file relationship of the bottles is achieved. When so regimented, the single-file of bottles B is fed in a suitable fashion which forms no part of the present invention to the filling station for reception of the liquid contents.

During the entire carton-unloading and article-regimenting process, the propulsion of cartons and articles is progressively more rapid so that no build-up or accumulation is experienced. Thus, the desired high rate of operation can be attained and jamming is effectively avoided.

The initial steps relating to the opening of the flaps F2, F3 and F4 of the inverted carton C can be described in greater detail. The inverted carton C is initially supported for movement adjacent its outer edges wherefore the outer side flaps F2, F4 are not only freed but are actually urged to partially opened positions. The support for the carton C is then transferred to the inner end flaps F1, F2 and any exposed bottles B whereupon the side flaps F3, F4 are then forceably swung to fully opened positions. With the side flaps F3, F4 fully open, the trailing end flaps F2 is then grasped and swung to a fully opened position as the carton C progresses with its inverted disposition maintained by the continued support of its exposed undersurface. This continuous support of the undersurface of the carton C assures retention of both the bottles B and the inserted liner L within the carton during the flap opening process described.

During the opening of the side flaps F3, F4, the carton C is frictionally propelled at one speed but thereafter its movement is accelerated so that a separation of successive cartons in the direction of motion is obtained. The increased speed is sufficiently great to assure removal of the opened trailing end flap F2 from contact by the successive carton C but need be no greater since the leading end flap F1 of each carton remains closed so as not to interfere with the proper conveyance and unloading of the preceding carton C.

The two side flaps F3, F4 and the trailing end flap F2 having been opened, the next steps provide for separation of the bottles B from the carton C but retention of the inserted liner L therewithin. Initially, the carton C, while still supported on its exposed undersurface, is resiliently grasped at its opposite sides, the resilient grasping force being sufficient to slightly displace the side walls of the carton wherefore the inserted liner L is squeezed therebetween and is thus frictionally held. While such frictional grasping force is maintained, the carton C is gradually lifted so that the bottles B are free to gradually emerge from their compartments and remain on the supporting surface in aligned, oriented disposition. It will be particularly observed that the forward rows of bottles B will be initially retained by the leading end flap F1 which only gradually opens as the carton C rises and thus serves to retain the liner L in the carton until the resilient grasping force is firmly established. As the leading end flap F1 opens, the forward rows of bottles B will gradually emerge from the carton C, being guided between the opening flap F1 and the successive row of bottles B already on the supporting surface. Thus, the unloading operation is carried out in a manner such that the bottles B emerge gradually and gently and are left after complete removal of the carton C, in oriented, aligned disposition upon a supporting surface.

The bottles B are now frictionally propelled on their supported undersurfaces or bases and in order to insure accurate regimenting into single-file relationship, additional steps can be taken to assure maintenance of precise oriented and aligned relationship of the bottles. Preferably, the progress of a parallel row of bottles B is resiliently impeded at a predetermined position along their frictionally propelled path, the resilient impeding force being greater than that experienced by the combined frictional propelling force of one row of bottles but less than the summation of the frictional propelling force from the accumulated abutting relationship of a predetermined number of successive rows. Thus, one row of bottles B will be temporarily restrained against further movement until lateral alignment is attained and one or more additional rows of bottles have come into abutting relationship therebehind whereupon the first row of bottles will be released for continued propulsion and the subsequent row of bottles will be moved into the aligning position. Although a temporary restraint of bottle flow is experienced to effect the alignment, no accumulation of bottles B will occur since if the bottle feed rate is increased, the rate of bottle-release will be equally raised.

During such propulsion of the bottles B and the temporary restraint of their motion, the bottles are held from the side so that undesired lateral displacement is precluded and longitudinal alignment is also maintained. If the bottles B are "flat" as shown in FIG. 1 they are pushed laterally during their advance so that a predetermined lateral displacement therebetween is attained without however disrupting their longitudinal and lateral alignment.

This longitudinal and lateral alignment is continually maintained as a parallel row of bottles B is released by the overcoming of the impeding force in the manner previously described. The release parallel row of bottles B is then advanced at a speed in excess of that at which they were previously propelled. Consequently, a separation of each successive row of bottles B in the direction of their movement is effected.

Finally each longitudinally separated row of oriented, aligned bottles B is received, and thereafter propelled at a higher rate in a direction transverse to the previous direction of motion, each bottle in the row being received in timed relationship, wherefore the row of bottles now moves in longitudinal single-file relationship.

Preferably, the mentioned transverse direction of single-file bottle movement is substantially less than a right angle relative to the previous direction so that the change of direction is not too abrupt and the desired high capacity operation can be maintained. The timed relation of bottle reception together with the previously attained lateral spacing of the bottles in each row is such that the bottles are conveyed transversely with some space therebetween. The single-file of bottles B is finally propelled toward the subsequent filling station in a conventional manner which maintains the alignment and orientation of the bottles requisite to perform the filling operation.

In accordance with additional aspects of the present invention, the described operation can be carried out with the preferred form of apparatus shown in the accompanying drawings. The entire apparatus, shown in FIG. 2 is under 17 feet in length, 4 feet in width, and 6 feet in overall height and is capable of unloading cartons and subsequently regimenting the unloaded articles at rates up to 300 articles per minute so as to provide more than adequate capacity for any commercially available filling machine.

For purposes of explanation, the entire apparatus as shown in FIG. 2 will be described in sections, each of which performs certain steps of the previously described operation, such sections being shown in greater detail in additional figures of the drawings. Generally, the first section is the flap-opening section 30 wherein the inverted carton C is propelled while first the two side flaps F3, F4 and then the trailing end flap F2 are opened. Thereafter, the opened carton C is delivered to the actual unloading section 40 wherein the carton C is grasped and lifted to allow egress of the bottles B therefrom into aligned, oriented dispositions. From this unloading section 40, the cartons C are delivered by a deviant path to a storage area while the bottles B continue to the regimenting section 50 wherein they are placed ultimately into aligned, oriented single-file relationship for delivery to a filling machine (not shown).

As shown most clearly in FIG. 2, the entire apparatus is mounted on a unitary table-like frame structure including a pair of horizontally-disposed, parallel frame members 60 which form the top of the table and which are carried at a convenient height by spaced pairs of upright legs or standards 62, 64. The unloading section 40 being intermediate, is disposed between the pairs of spaced legs 62, 64 while the flap-opening and regimenting sections 30 and 50 project from opposite ends thereof for easy access by the operator. Preferably, the horizontally extending table frame members 60 are channel members which generally support therebetween a series of conveyors for moving the cartons C and the bottles B or other articles generally from the right to the left, as viewed in FIG. 2. The legs 62, 64 are also formed by channel members and one pair of legs 62 projects above the level of the horizontally extending frame members 60 and supports in upwardly inclined disposition a carton take-off conveyor to be described hereinafter. Both the frame members 60 and legs 62, 64 are joined at intervals by transverse frame members which maintain rigidly their described disposition.

*Flap-opening section 30*

Figure 3:
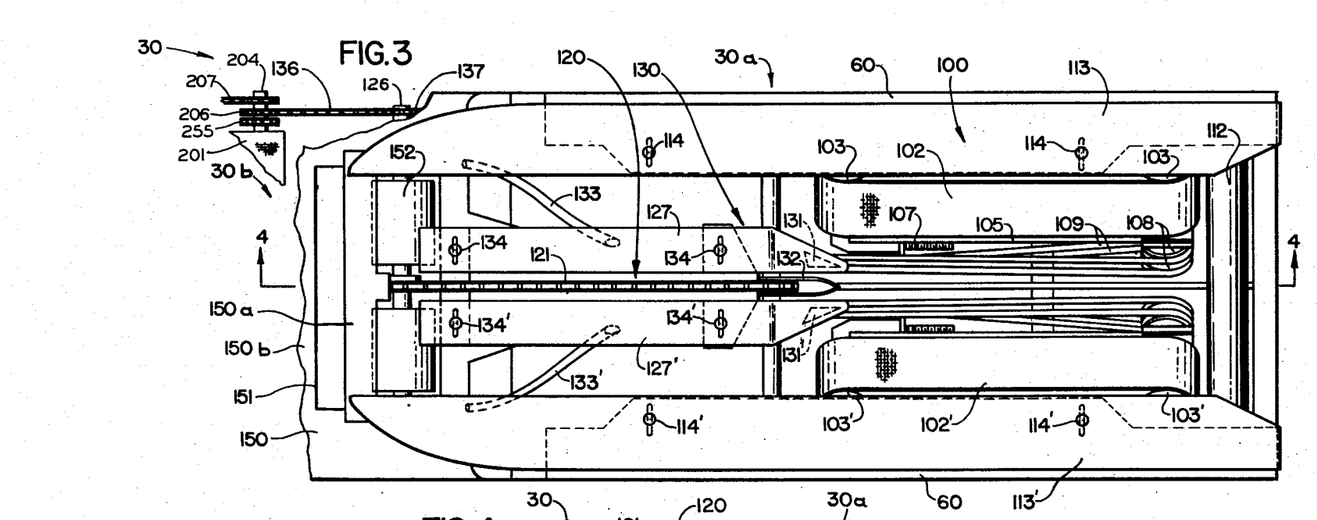
FIG. 3 is an enlarged fragmentary top plan view of the flap-opening section at the right end of the apparatus as illustrated in FIG. 2.
Figure 4:
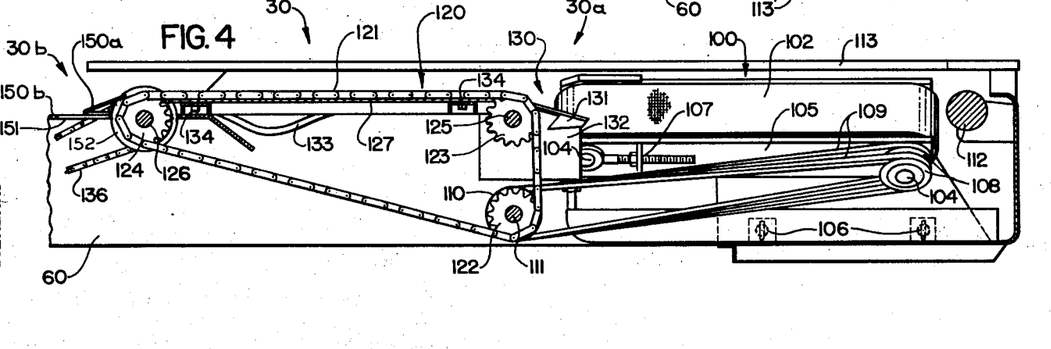
FIG. 4 is a fragmentary central sectional view taken along line 4—4 of FIG. 3.

With additional reference to FIGS. 3 and 4, the flap-opening section 30 of the device includes side-flap and end-flap opening portions 30a, 30b, supported by and between the projecting portion of the channel members 60 and including suitable means to conduct the cartons through this first section to the actual carton unloading section 40. The arrangement is such that each carton, upon reaching the unloading section 40, has both outer side flaps F3, F4 and the trailing inner end flap F2 in opened disposition and thus is ready for the unloading operation.

The side-flap opening portion 30a includes a first conveyor 100 that is generally V-shaped in cross-section so as to support an inverted carton C at its side edges and permit the outer side flaps F3, F4 to swing partially open. The conveyor 100 is formed by two flat endless belts 102, 102' disposed in mirror image relationship on opposite sides of a central vertical plane extending along the direction of carton movement, and including the section line 4—4. Since the two belts forming the first conveyor 100 are arranged in such mirror image relationship, only one belt 102 and the elements associated therewith will be described and like numerals will be employed to designate similar parts associated with the other belt 102', but with an added prime notation to enable differentiation. The endless belt 102 is supported for movement on rollers 103 spaced in the direction of carton motion, each roller being mounted on a shaft 104 (see FIG. 4) extending outwardly from the mentioned central plane and upwardly therefrom at a predetermined angle wherefore, in a direction transverse to movement, the upper flight of the belt 102 is disposed upwardly and outwardly from such central plane. Preferably the belt 102 has a roughened rubber surface so as to provide considerable frictional engagement with a supported carton C to insure firm propulsion thereof.

Support for the belt rollers 103 and shafts 104 is provided by a bracket 105 which mounts the shafts at its upper end and is adjustably connected at its lower extremity to the lower flange of the channel member 60 through slotted connections indicated at 106 in FIG. 4 which enable the entire bracket and the belt 102 supported thereon to be adjusted vertically. In order to tighten the belt 102 on the rollers 104, one roller shaft 104 is adjustably mounted on the bracket, as shown at 107, and the adjustment is obviously made to provide a taut supporting surface for a carton C.

In order to achieve movement of the conveyor belt 102 and effect the desired carton conveyance, one roller shaft 104 has a pair of pulleys 108 thereon over which are trained endless V-belts 109 which, in turn, are operably engaged at their remote ends with similar pulleys 110 mounted on one shaft 111 of a second conveyor 120 to be described hereinafter.

To assure proper entry of a carton C onto the V-shaped first conveyor 100, a freely rotatable horizontal roller 112 is mounted at the entrance end of the apparatus or to the right of the first conveyor, as viewed in FIGS. 3 and 4. Additionally, guide rails 113, 113' are mounted above the previously described channel members 60 forming the frame and are connected thereto by slotted connections shown at 114, 114' wherefore such guide rails can be adjusted inwardly or outwardly from the described central plane so as to closely accommodate therebetween the received carton. Since a carton C manually fed by an operator is maintained in a horizontal disposition through its movement over the entrance roller 112 and is laterally aligned by the guide rails 113, 113', it will be supported centrally of the V-shaped first conveyor 100 and thus be retained in its desired horizontal disposition as it moves along such conveyor.

The first conveyor 100 is sufficiently long so that for any length box or carton C which is to be accommodated, such carton will rest entirely thereon before moving onto the mentioned second conveyor 120. Consequently, the side flaps F3, F4 of such supported carton C can swing into partially-opened disposition at this position of travel through the side-flap opening portion 30a of the apparatus. Actually, since the carton C is supported at its outer edges where the outer side flaps F3, F4 pivotally join the body portion of the carton, the side flaps are urged into such partially opened disposition by frictional engagement with the belts 102, 102'. Thus, this first conveyor 100 not only permits the side flaps F3, F4 of the carton C to open, but is actually arranged to instigate such flap opening.

As previously stated, the first conveyor 100 is sufficiently long to accommodate any carton C which it is desired to handle. On the other hand, if a carton C of greater width is to be handled, the guide rails 113, 113' are adjusted outwardly the required amount, such adjustment being made with care to assure that each side rail is the same distance from the described central longitudinal plane. Thereafter, each belt 102, 102' is lowered an equal amount such that a carton passing over the entering roller 112 can smoothly transfer onto the belt surfaces. Practical limits obviously exist relative to the size of cartons C which can be handled by the apparatus shown in the drawings, but it is obvious that no theoretical limitation exists whatsoever.

From the exit end of the first conveyor 100, the mentioned second conveyor 120 extends longitudinally of the apparatus a distance also somewhat in excess of the longest carton to be handled by the apparatus. This second conveyor preferably takes the form of an endless roller chain 121 trained about three spaced sprockets 122, 123, 124 keyed respectively on the previously mentioned shaft 111 and two parallel shafts 125, 126, as shown in FIG. 4, so as to lie substantially in the previously described central plane, and with its upper flight in the same plane as the top of the entrance roller 112. Thus, a carton C, previously propelled by frictional engagement with the angularly-disposed belts 102, 102' of the first conveyor 100 at its outer edges, is now grasped and propelled at the middle of its undersurface.

Sliding support of the carton C is provided by a pair of similar horizontal plates 127, 127' disposed in mirror image relationship on opposite sides of the conveyor chain 121 and at a level just slightly beneath that of its upper flight. At their ends which project beyond the entrance end of the second conveyor 120, these plates 127, 127' decline slightly and are tapered to form the pointed end of a side-flap opening plow, generally indicated at 130. The pointed end of the plow 130 is disposed so as to pass below the lower surface of the inverted carton C but above the partially opened side flaps F3, F4 thereof as the same moves from the first conveyor 100 onto the second conveyor 120 so that carton support is transferred from the side edges of the carton to the inner end flaps F1, F2 thereof. Small flap-diverting elements 131, 131' are secured to the under surface of each plate 127, 127' adjacent its tapered extremity and a vertically-disposed divider 132 encompasses the end of the roller chain 121 so that no flap engagement with the roller chain conveyor 120 will be experienced. At a distance approximately equal to a carton's length from the pointed end of the plow 130, a rod 133, 133' forming an additional part of the plow 130 is connected to the undersurface of each plate 127, 127' to follow a helical path extending downwardly, outwardly and thence upwardly again. The precise configuration of each rod 133, 133' is such that a side flap F3 or F4 already partially opened will be engaged and thence swung into a fully opened or substantially horizontal, outwardly projecting disposition as the carton C moves along the second conveyor 120 toward the exit end thereof.

As has been briefly mentioned, the second conveyor 120, like the first, is sufficiently long to accommodate any carton less than a predetermined length. More particularly, this second conveyor 120 has an overall length equal to that of a predetermined carton C plus the additional length of the helical flap-opening rods 133, 133'. To provide for variations in carton width, the guide rails 113, 113' which extend along the outer sides of the first conveyor 100 continue along the outer sides of the second conveyor 120 to maintain carton alignment. Since a carton C of different width also has side flaps F3, F4 of different dimensions, the plow 130 is adjustable to provide for proper opening of the various flap sizes. For this purpose, the two plates 127, 127' are mounted on the frame with slotted connections, indicated at 134, 134', wherefore each can be individually adjusted laterally relative to the central plane wherein the second conveyor 120 lies. For cartons C of greater width and thus having larger side flaps F3, F4, these plates 127, 127' are adjusted outwardly from such central plane.

In order to drive the second conveyor 120, a drive chain 136 is connected between a sprocket 137 on its forward shaft 126 and a similar sprocket 206 on one shaft 204 of a third conveyor 200 (see FIG. 7) forming part of the carton-unloading section 40. This drive to the second conveyor 120 is, in turn, transferred to the first conveyor 100 by the previously described V-belts 109 and pulleys 108, 110. As will be described in detail hereinafter, the third conveyor 200 is driven in a suitable manner, wherefore it will be seen that the first, second and third conveyors 100, 120, 200 partake of correlated movement. Preferably, the first and second conveyors 100, 120 are driven at substantially the same speed while the third conveyor 200 moves at a slightly higher speed.

After a carton C has passed over the first and second conveyors 100, 120 and both side flaps F3, F4 have been opened, it now remains to effect opening of the trailing end flap F2 of the carton before the carton unloading operation can be instigated. This function is accomplished in the end-flap opening portion 30b which extends from the second conveyor 120 to the mentioned third conveyor 200. Such portion includes a plate 150 having a lateral slot 151 arranged to receive the trailing end flap F2 of the carton C as the same passes thereover and to swing this trailing end flap into fully opened position. More particularly, as shown in FIGS. 3 and 4, the plate 150 includes a first section 150a which slopes downwardly from the second conveyor 120 to the edge of the transverse slot 151. The remaining section 150b of the plate lying in advance of the slot 151 is substantially horizontal and is approximately in the plane of the upper flight of the third conveyor 200. Since the sections of the plate 150 on opposite sides of the transverse slot 151 are angularly disposed, an end flap F2 progressing downwardly along the sloping section 150a of the plate is urged into the slot and is subsequently caught by the remote edge thereof as the carton C progresses and is gradually turned to a fully opened position. The entrance section 150a terminates at a level slightly above the horizontal plane defined by the exit section 150b of the plate so that the flap F2 is free to open to a fully horizontal position without binding and may thereafter be withdrawn from the slot 151 as the carton C continues its progression along the third conveyor 200.

It will be clear from the foregoing that the essential feature of this end flap opening portion 30b is the related angularity of the plate sections 150a, 150b on opposite sides of the slot 151 which permits free entry of the flap F2 into the slot and subsequent free withdrawal therefrom, in each case without catching or binding which otherwise might jam the entire apparatus.

In order to propel a carton across the described plate 150 and onto the third conveyor 200, a pair of frictional-surface rollers 152 are mounted on the transverse shaft 126 which, in turn, supports the forward sprocket 124 of the second conveyor 120. These rollers 152, mounted on opposite sides of the conveyor 120, are of greater diameter than the chain sprocket 124 so that a carton C with its side flaps F3, F4 open will be engaged by such rollers, lifted from engagement by the central conveyor chain 121, and advanced at a slightly higher speed onto the end-flap opening portion 30b of the apparatus. The increase in speed causes a longitudinal separation of cartons C in the direction of their motion sufficient to allow the end flap F2 to open and be free from contact with a successive carton.

The dimensions of the rollers 152, the flap-opening plate 150 and the slot 151 therein are such that any carton which can be accommodated by the apparatus is in turn accommodated thereby without necessity for any adjustment. The overall length of the plate 150 is preferably less than the length of the smallest carton to be handled so that the carton C is engaged and driven by the rollers 152 or the third conveyor 200 at all times.

The side flaps F3, F4 and the trailing end flap F2 of the carton C having been opened, the carton is now moved fully onto the mentioned third conveyor which constitutes part of the actual carton-unloading section 40 of the apparatus.

*Carton unloading section 40*

With additional reference to FIGS. 5 through 9 of the drawings, the carton unloading section 40 of the apparatus includes the mentioned third conveyor 200 which is formed by a woven-wire endless belt 201 trained about parallel rollers 202, 203 at the opposite ends of the carton unloading section. These rollers 202, 203 are rotatably supported respectively on shafts 204, 205 mounted in suitable bearings (not shown) on the channel members 60 forming the longitudinal frame of the apparatus. The shaft 204, which as previously mentioned carries the sprocket 206 enabling connection to the second conveyor 120, also carries a second sprocket 207 (see FIG. 7) from which a sprocket chain 208 extends to a similar sprocket 209 on the remote roller shaft 205 (see FIG. 11). A similar conventional sprocket chain drive connection indicated at 210 is made between the shaft 205 and the output shaft 211 of a continuously-variable-speed drive unit 212 that includes an elecrtic motor of requisite horsepower.

A rigid metal plate 215 is supported between the frame channel members 60 to in turn support the upper flight of the woven wire belt 201 as the same moves from the entrance to the exit end of the carton unloading section 40. The surface character of this woven wire belt 201 is such that a predetermined frictional propelling force is applied to an article placed thereon. More specifically, a bottle B placed on the moving belt 201 will be frictionally moved or propelled thereby but exterior forces can be applied to the bottle to restrain its movement with the belt or shift the bottle laterally when such restraint or lateral shifting is desired for purposes such as those to be described hereinafter.

As previously mentioned, the carton unloading section 40 includes a carton take-off conveyor 220 that generally is arranged to grasp the sides of an opened inverted carton C at the entrance end of the unloading section and gradually lift such carton from the surface of the belt conveyor 200 while leaving the bottles on such belt conveyor for subsequent conveyance to the regimenting section 50.

The carton take-off conveyor 220 includes a pair of arms 221, 221' that project in parallel relation and are inclined upwardly in the direction of movement of the cartons C and bottles B, such arms serving as direct supports for the actual carton grasping and conveying elements. Both the arms 221, 221' and the elements supported therefrom are arranged in mirror-image relationship on opposite sides of the aforementioned central vertical plane wherefore the drawings (FIGS. 6 and 7) and following detailed description are limited, at least in part, to one half of the structure, and like parts of the other half will be indicated by like numerals with an added prime notation.

Figure 6:
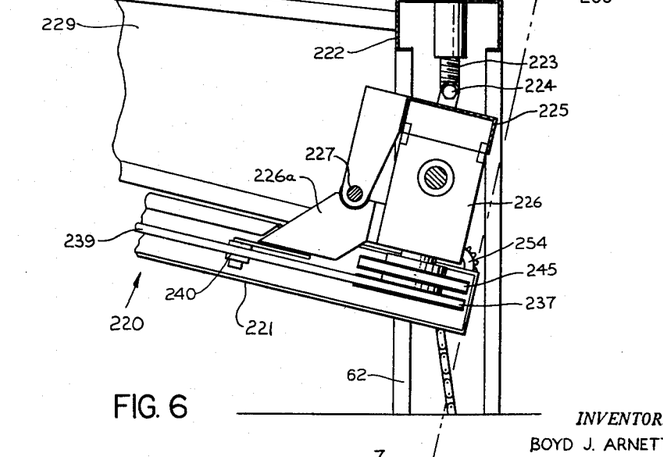
FIG. 6 is an enlarged, fragmentary sectional view taken substantially along line 6—6 of FIG. 5, to more clearly illustrate certain drive and adjustment features of the carton unloading section of the apparatus.
Figure 7:
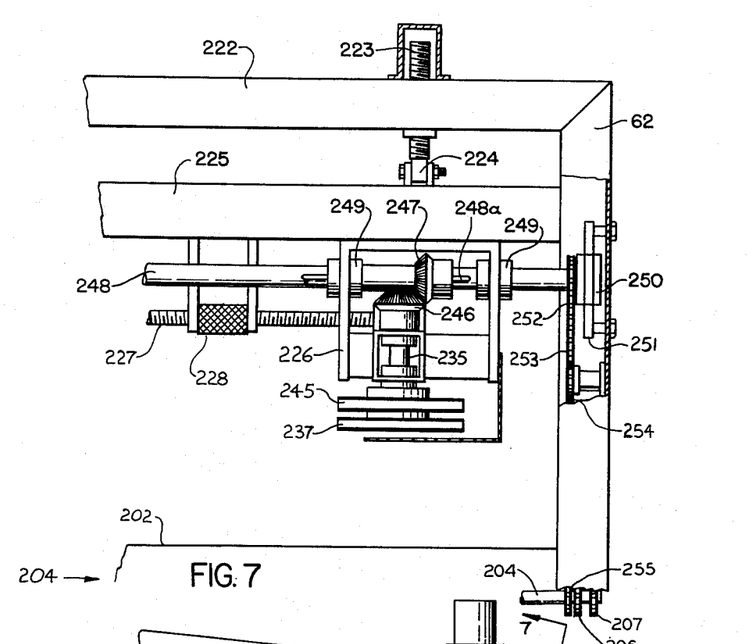
FIG. 7 is a sectional view taken along line 7—7 of FIG. 6.

To suspend the arms 221, 221', a transverse frame member 222 is rigidly connected in bridging relation between the upper extremities of the upwardly projecting legs or standards 62 at the entrance end of the unloading section 40, as best shown in FIGS. 6 and 7. From laterally spaced points on this frame member 222, bolts 223 pass through vertically threaded bores therein and project downwardly to suspend at their lower ends by pivotal connections 224 a transversely extending channel member 225 whose opposite extremities are adjacent the upright legs 62 of the apparatus. Boxlike brackets 226 are mounted for slidable adjustment longitudinally of the channel member 225, or in other words, transversely with respect to the longitudinal direction of the carton movement through the apparatus and one end of each arm 221 is rigidly secured as indicated at 226a in FIG. 6 to a respective one of these brackets 226, wherefore it will be clear that both arms 221 and 221' can be adjusted laterally of the machine through sliding of these brackets 226 on the transversely extending channel member 225 and vertical adjustment can be accomplished through mere turning of the suspending adjustment bolts 223 which in turn mount the transverse channel member 225 on the rigid frame member 222. To facilitate the lateral adjustment, an adjustment screw 227 is threadedly connected to the box-like brackets 226 at its opposite ends, the threads being of equal but opposite pitch at its respective ends so that turning of the screw by manipulation of a central knurled handle 228 will cause the two brackets 226, 226' to move together or apart, as the case may be.

The projecting arms 221, 221' are also suspended for vertical and/or horizontal adjustment at another position that is spaced from the vertical legs 62. For this purpose, a pair of braces 229, 229' are rigidly attached adjacent the upper end of the legs 62 to project in substantial parallelism above the channel members 60 of the main frame and support rigidly between their forwardly projecting ends a transverse member 230 having a longitudinal slot 231 therein. As shown best in FIG. 8, the arms 221 are pivotally connected at positions intermediate their ends to the lower ends of adjustment bolts 232 which extend upwardly therefrom through the mentioned longitudinal slot 231 in the transverse member 230. Heavy nuts 233, 234 on each bolt 232 engage the upper and lower surfaces of the transverse slotted member 230 to provide through appropriate turning of such nuts for both horizontal and vertical adjustment of both arms 221, 221'. It will be clear that appropriate adjustments at the two supporting positions for the arms 221, 221' will not only enable horizontal and/or vertical translational movement of such arms, but will also enable the angle of inclination to be varied when so desired. Any variation of this angle of inclination is accommodated by the pivotal connection at both positions of suspension of the arms 221, 221'.

Figure 5:
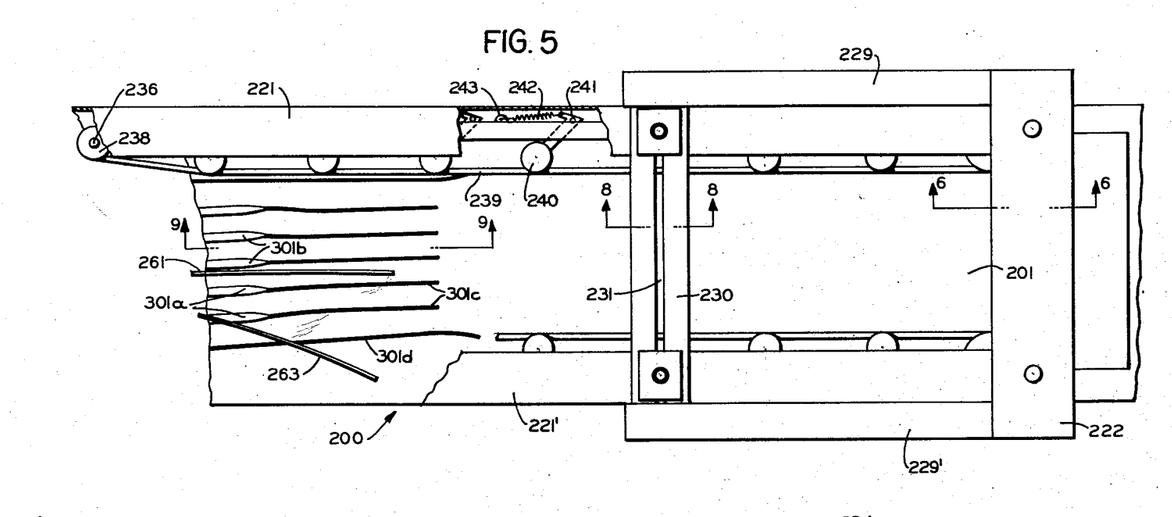
FIG. 5 is an enlarged fragmentary top plan view of the carton unloading section located centrally of the apparatus, as shown in FIG. 2.
Figure 8:
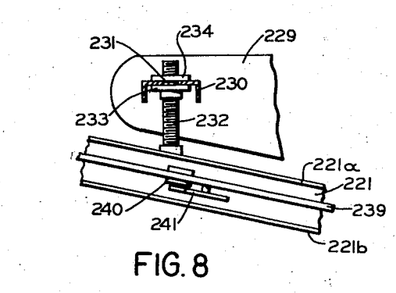
FIG. 8 is a fragmentary sectional view taken along line 8—8 of FIG. 5.

The mentioned arms 221, 221' are channel members and, as can best be visualized by reference to FIGS. 5 and 8, the flanges 221a, 221b of the channel are directed inwardly. Adjacent opposite ends of one arm 221, shafts 235, 236 project between the channel flanges 221a, 221b and carry pulleys 237, 238, each of whose diameter is sufficiently great so that a portion of its circumference projects inwardly beyond the inwardly directed flanges of the chanel member a small amount. An endless V belt 239 is trained about these pulleys 237, 238 so that its inner flight extends substantially the full length of the arm 221 and is, at a plurality of positions, spring-urged further inwardly by engagement with a number of like idler pulleys 240 of smaller diameter, each of which is mounted for free rotation at one end of a pivotally supported lever arm 241, whose other end is connected to a spring 242 that is tensioned between this end of the lever arm and a rigid pin 243 on the arm 221. When supported as described and urged inwardly by the plurality of spring-urged idler pulleys 240, the inner flights of the belts 239, 239' on the opposite, but parallel arms 221, 221', normaly take the disposition shown in FIG. 5 whereat the space between the inner belt flights is slightly less than the width of the carton C to be handled by the apparatus, but as a carton is grasped and moved between the belt flights, the individual pulleys 240, in turn, can shift outwardly against the urgency of their respective springs 242 to permit passage of the carton but maintain a constant resilient grasping force thereagainst. As shown in FIGS. 6 and 7, a second pulley 245 with a belt on its rim is mounted adjacent the described V-belt pulley 237 at the entrance end of the unloading section 40 to stabilize initial grasping of the carton C, as will become more apparent hereinafter.

In order to drive the V-belts 239, 239' so that the cartons C may be conveyed by the carton take-off conveyor 220, the pulley-supporting shaft 235 at the entrance end of the unloading section carries a bevel gear 246 which meshes with another bevel gear 247 on a transversely extending shaft 248 that is in turn supported for rotation in spaced bearings 249 on the previously mentioned box-like bracket 226 secured for lateral adjustment on the transverse channel member 225, as illustrated clearly in FIG. 7. To permit such lateral adjustment, the beveled gear 247 on the transverse shaft 248 is keyed thereto in an axially-extending slot 248a and the bearings 249 are also slidable longitudinally or axially of the transverse shaft.

The end of the shaft 248 is supported in another bearing 250 mounted for vertical adjustment in a slotted guide plate 251 on the upright leg 62, thus enabling the previously described vertical adjustments of the conveyor 220 to be made. A sprocket 252 is mounted adjacent the end of the shaft 248 still within the confines of the upright leg or standard 62 and a chain 253 is trained about this sprocket, an intermediate tensioning idler sprocket 254, and a drive sprocket 255 thereunder on the previously described shaft 204 that supports one end of the woven wire belt conveyor 200, wherefore correlated movement of such belt conveyor 200 and the carton take-off conveyor 220 is achieved. Preferably, the correlated connection is such that the horizontal component of motion of the V-belts 239, 239' is equivalent to the rectilinear motion of the belt conveyor 200.

When a loaded carton C with its side flaps F3, F4 and trailing end flap F2 opened is received from the flap-opening section 30, it is moved forward on the woven wire belt conveyor 200 a short distance whereat initial engagement with the carton take-off conveyor 220 is established. Such initial engagement is at two points on each side of the carton C, the belts on both pulleys 237, 245 on each side making contact substantially simultaneously, wherefore a stabilized grasping support is established and the inverted disposition of the carton is maintained. With continued movement, linear contact, as opposed to point contact, is established between the carton C and the inner flights of the inclined V-belts 239, 239' on opposite sides thereof and the inverted disposition of the carton is accurately maintained during its entire ascent.

As the carton C is carried beyond the initial pulleys 237, 245, it is resiliently grasped between the spring-urged longitudinal V-belts 239, 239', the force being sufficient to effect slight inward displacement of the carton sides into pinching or grasping engagement with the contained liner L. Thus, as the carton C ascends, the bottles B are left on the belt conveyor 200 but the liner L is carried upwardly with the carton. Since the bottles B emerge from their liner compartments, they are left on the belt conveyor 200 in aligned, oriented disposition in a succession of parallel rows.

During the initial stage of carton ascent, only the side flaps F3, F4 and trailing end flap F2 are open so that the bottles B in the rear portions of the carton C can emerge freely therefrom but the forward rows of bottles B as well as the liner L are retained in the carton by the leading end flap F1 which only gradually swings open as ascent of the grasped carton continues. The liner L is retained by the end flap F1 sufficiently long to enable the V-belts 239, 239' of the carton take-off conveyors 220 to establish the firm gripping engagement with the carton C and the liner L, as previously described.

As the leading end flap F1 gradually swings open with continued carton ascent, the forward rows of bottles B are permitted to emerge under gravitational force gradually, being guided by contact with the opening flap F1 so that the bottles will be aligned transverse to the direction of carton motion. As their guided emergence continues, they will contact the successive rows of bottles B, previously deposited on the belt conveyor 200, and will through such contact be deposited in alignment with such successive rows wherefore all rows emerging from the carton are transversely aligned quite precisely.

After a carton C has been grasped and gradually moved upwardly by the carton take-off conveyor 220, leaving the bottles B in oriented aligned relation on the woven wire belt conveyor 200 thereunder, the unloaded carton is delivered to a carton discharge means generally indicated at 260 arranged to effect the return of the empty carton to an upright disposition and its discharge to a position laterally of the apparatus from where it can be carried to any convenient storage area. With reference to FIGS. 2 and 5, this carton discharge means 260 includes a rod section 261 supported by a bracket 262 depending from the extreme end of one of the arms 221, 221' so that the rod section extends in substantial parallelism to the arms at a point substantially midway therebetween and at a level slightly thereunder. More precisely, this level is such that the leading flap F1 of a carton C carried by the carton take-off conveyor 220 will, immediately after the bottles B have been deposited on the belt conveyor 200, engage the rod 261 so as to again close and reestablish its retention of the liner L. Thereafter, the carton C will arrive at the exit end of the carton take-off conveyor 220 with the central undersurface of the carton brought entirely over this rod 261, and when freed from its support by the carton take-off conveyor, the carton C will be pushed along the rod 261 with its undersurface sliding thereon. A second rod section 263 is supported from and under the other arm 221' of the carton take-off conveyor 220 so as to engage the side of a carton C arriving at the end of the take-off conveyor. From such supported position, this second rod section 263 thereafter extends in a gradually curving path extending inwardly and downwardly until it eventually arrives at a position immediately under the remote projecting end of the first described rod section 261. Conveniently, as shown, the two rod sections 261, 263 are joined at this point so that a single rod can actually be appropriately bent to form the two sections. As a carton C is pushed along the rod sections 261, 263 by the pressure of succeeding cartons, it will be gradually turned and will eventually pivot about the lower inwardly curving rod 263 to fall into a substantially upright disposition on the left side of the apparatus frame, as viewed in the direction of carton motion.

While the cartons C are successively being discharged in the manner described above, the bottles B in their successive parallel row formation are moved on the woven conveyor belt 201 toward the article regimenting section 50 of the apparatus.

*Article regimenting section 50*

While the bottles B are removed, as previously described, in a controlled gradual fashion from the carton C onto the woven wire conveyor belt 201 so that good orientation and alignment thereof is achieved, the article regimenting section 50 may, if desired, include initial means for precisely aligning and orienting the articles to thus eliminate the possibility of jamming or other malfunctioning. Such aligning and orienting means are particularly important when articles, such as "flat" bottles, are to be regimented into single-file relation.

Figure 9:
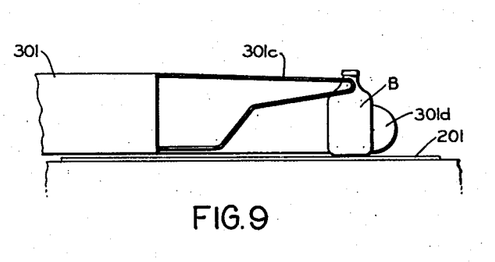
FIG. 9 is a fragmentary sectional view taken along line 9—9 of FIG. 5 showing certain article-separating partitions.

To assure longitudinal alignment and orientation of the bottles B, the article regimenting section 50 includes a plurality of longitudinally extending guide channels that are formed between substantially parallel partitions 301 that extend substantially the entire length of the article regimenting section 50 so as to retain the bottles therebetween during their entire traverse of this section of the apparatus. As clearly illustrated in FIGS. 10 and 11, each partition 301 includes two vertical plates 301a, 301b secured to the frame of the apparatus so as to extend in parallelism substantially over the entire length of the regimenting section 50. The extremities of the plates 301a, 301b project rearwardly relative to the direction of article motion over the exit end of the woven wire conveyor belt 201 and converge at their extremities whereat a further projection 301c of each partition 301 is mounted. This projection portion 301c, as best shown in FIGS. 5 and 9, constitutes a metal finger formed by an appropriately bent metal rod whose extremity is disposed longitudinally of the conveyor belt 201 at a position to engage bottles B fully freed from the lifted carton C. The end of the finger is at a level equivalent to the neck of a bottle B on the conveyor belt 201, and slopes gradually downwardly in the direction of article motion, so that while initial engagement is made with the neck of a bottle B moving on the conveyor belt 201, such engagement gradually is transferred downwardly as the bottle progresses until it is entirely with the main body portion thereof. As shown in FIG. 5, the projecting portions 301d of the outermost partitions 301 are formed by plates that are curved outwardly at their extremities so as to bring any laterally displaced bottles B into the general area of the separating partitions.

Since the neck portion of the bottle B is smaller than the remainder thereof, the initial engagement of the extremity of the finger 301c with such neck portion will allow for engagement with a bottle laterally displaced from the desired line of motion on the conveyor belt 201. As such laterally displaced bottle B moves along on the conveyor belt 201, the finger 301c will exert pressure thereagainst so that the bottle will be pushed into longitudinal alignment with the desired path. It will be remembered that the woven wire belt 201 merely frictionally engages the base of the bottles B so that such lateral shifting is permitted. The downward slope of the fingers 301c provides for the general application of the laterally directed force to the bottles B so that the return of a laterally-displaced bottle to the proper longitudinal disposition on the conveyor belt 201 is achieved gradually and gently. If furthermore, a bottle B of the "flat" type described hereinbefore has been turned slightly on the conveyor belt 201 during the unloading operation, the initial engagement of the finger 301c with its neck and the subsequent gradual lowering of such engagement as the bottle moves longitudinally on the conveyor belt will effect an engagement with the sloping shoulders of the bottle between the neck and main body portion thereof so as to effect a rotation of the disoriented bottle into the desired oriented position with its flat side surface in substantial parallelism with the direction of motion. In actual operation of the apparatus, the bottles, arriving at the mounted end of the fingers 301c where the two convergent plates 301a, 301b of the main partition join, are properly aligned longitudinally of the apparatus and are also in oriented disposition. Furthermore, it will be noted that the aligning and orienting is instigated immediately after the bottles B are freed from the cartons C so that a continuing controlled guidance thereof is effected.

The files of successive bottles B having thus been longitudinally aligned and oriented, it is preferable to effect precise lateral alignment of each successive row of bottles to assure ultimate regimentation of the bottles into the desired single-file relationship without occurrence of jamming or other mal-functioning. For this purpose, a row-aligning mechanism is disposed between the end of the woven wire conveyor belt 201 and the beginning of a fourth conveyor means, which, as will be described in greater detail hereinafter, constitutes a series of parallel, individual file conveyors 335 disposed respectively between adjacent partitions 301 of the regimenting section 50 of the apparatus. The row-aligning mechanism includes an article transfer means 310 arranged cooperatively with an article impeding means 320 to effect the alignment.

The transfer means 310 includes a pair of small rollers 311, 312 disposed between the third conveyor 200 and the mentioned file conveyors 335 with their upper article-engaging surfaces in substantially coplanar relationship therewith. These two rollers 311, 312 are driven by an endless V-belt 313 trained about one end thereof and a drive pulley (not shown) mounted thereunder, the direction of motion of the upper exposed surfaces of the rollers being the same as the direction of motion of the third and fourth conveyors. A stationary rod 315 is supported between the partitions 301, terminating adjacent the first roller 311 and the extremity of the upper flight of the woven wire conveyor belt 201, such rod being of a length insufficient to support an entire bottle B thereon. Additionally, a similarly short stationary transfer plate 316 is rigidly supported between the second roller 312 and the file conveyors 335 so that a smooth transfer from the rollers to such conveyor is achieved.

Figure 10:
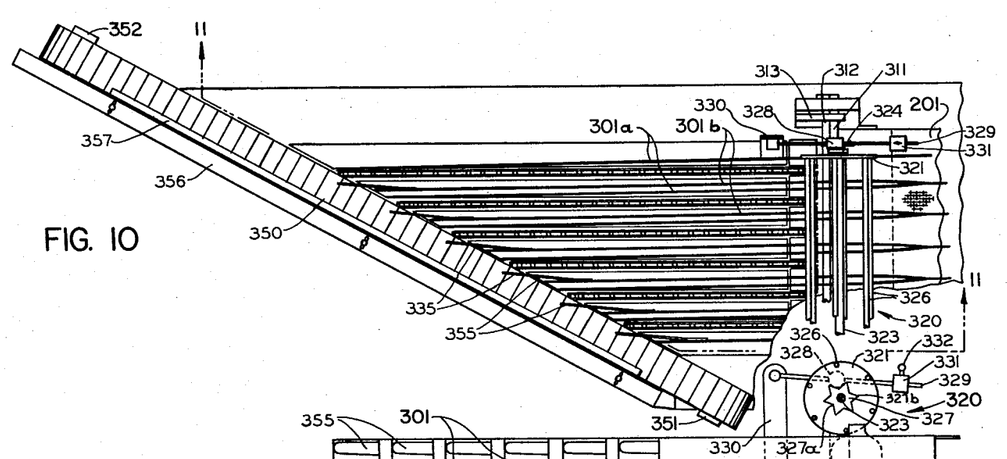
FIG. 10 is an enlarged fragmentary top plan view of the article-regimenting section located at the left end of the apparatus, as viewed in FIG. 2.
Figure 11:
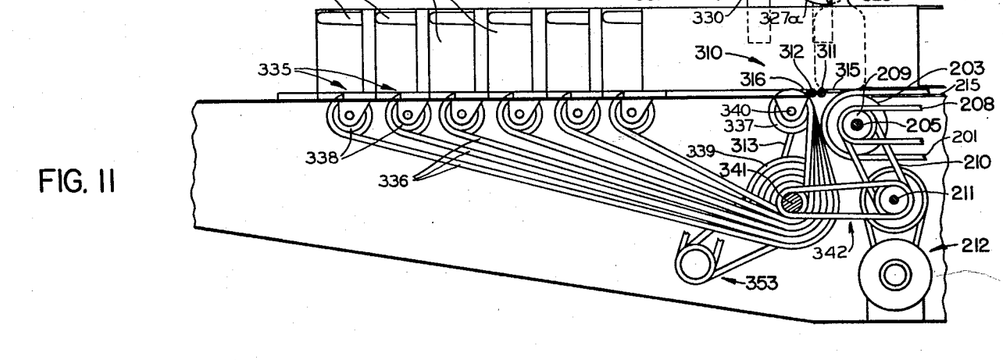
FIG. 11 is a sectional view taken along line 11—11 of FIG. 10, and FIGS. 12 through 18, inclusive, are a series of diagrammatic views illustrating certain steps in the progress of a carton and the glass bottles therein, such as shown in FIG. 1, through the apparatus.

The mentioned impeding means 320 is generally arranged to engage the neck of a bottle B on the short stationary rod 315 between the third conveyor 200 and the transfer roller 311 and to render the bottle immobile until a predetermined external force is brought into engagement therewith to overcome the impeding engagement and permit transfer of the bottle onto the transfer rollers 311, reference to FIGS. 10 and 11, the impeding means includes a pair of wheels 321, 322 supported at the opposite sides of the frame on a shaft 323 extending transversely thereof and mounted in suitable bearings on brackets 324, 325 projecting upwardly from the outer partitions 301 of the regimenting section 50. Six rods 326 join, in circumferentially spaced relation, the rims of the wheels 321, 322 in substantial parallelism with their mounting shaft 323 and the wheel diameter is such that the rod 326 disposed directly under the supporting shaft is at a level equivalent to the neck of a bottle being conveyed by the 312 and thence to the file conveyor 335. With particular apparatus. Adjacent one extremity of the rotatably supported shaft 323, a star-shaped cam 327 having six indentations 327a is secured thereon and a cam follower 328 in the form of a roller is arranged to rest in one or another of such indentations dependent upon the rotative disposition of the cam. When the cam-follower 328 rests in one of such indentations, a respective one of the rods 326 is disposed to engage the neck of a progressing bottle at a position substantially centrally over the short stationary transfer rod 315. The cam follower 328 is rotatably mounted at one side of a bar 329 pivotally secured at its one extremity to a suitable rigid supporting bracket 330. Adjacent its free end the bar 329 slidably supports a weight 331 having a set screw 332 thereon so that the position of the weight on the bar can be fixed at any desired point. Thus, it will be seen that dependent upon the position of this weight 331, the roller or cam follower 328 will be urged downwardly into one indentation 327a of the cam 327 with a predetermined force. Dependent upon this force, a predetermined torque must be exerted against the wheel-supported rods 326 to effect rotation of the shaft 323 and the star-shaped cam 327 thereon and enable the cam follower 328 to ride over one high point 327b thereon and drop into the adjacent indentation 327a.

When one of the impeding rods 326 is initially engaged by the necks of an advancing row of bottles B, each bottle rests partially on the stationary transfer rod 315 but its rearmost portion is still engaged and urged forwardly by the woven-wire belt 201. Consequently, the top of the bottle B is impeded but its base is advanced until it moves onto the stationary rod 315. The bottle B is thus tilted rearwardly with its foremost end over but not in engagement with the transfer roller 311. This position of the bottle B is maintained until additional bottles on the woven wire belt 201 are advanced into contact with the impeded bottle. Such contact is obviously with the shoulder portion of the impeded bottle so that with sufficient force, the bottle is moved into upright disposition with its neck pushing the impeding rod 326 in the direction of bottle motion and its base coming into contact with the transfer roller 311 thereunder. Once the cam follower 328 has passed the cam high point 327b, its weight will quickly urge the impeding rod 326 arcuately upward out of bottle impeding position and position another rod in the path of the succeeding row of bottles.

Normally, the adjustable weight 331 on the cam-follower mounting bar 329 is set so that two rows of bottles B must arrive in abutting relation behind the impeded row of bottles before sufficient force is exerted through frictional propulsion of the succeeding bottle rows by the woven wire conveyor belt 201 to overcome the resilient impeding force and release the first row of bottles for continued propulsion in precisely aligned and oriented dispositions. The next row of bottles B is now moved into impeding position and the operation is repeated at intervals dependent upon the supply of bottles on the woven wire conveyor belt 201 wherefore it is clear that an accumulation of bottles behind the impeding means 320 is precluded. It will also be observed that adjustments of the disposition of the weight 331 can be made even during operation of the device so that empirical determination of the desired impeding force can be achieved without interruption of operation.

Since the bottles B are laterally confined by the partitions 301 during the described transfer, each row of bottles as it is released by the described row-aligning mechanism, will move to the file conveyors 335 in properly oriented as well as longitudinally and laterally aligned disposition. Each file conveyor 335 consists of an endless roller chain 336 trained about suitable sprockets 337, 338, 339 so that the upper flight of each file conveyor chain extends generally in parallelism to the partitions 301 disposed on opposite sides thereof. However, as is clearly illustrated in FIG. 10, the upper flight of each roller chain 336 extends from a position substantially centrally of the partitions 301 at its entrance end to a position immediately adjacent one of the partitions at its exit end. The sprockets 337 supporting the roller chains 336 at the entrance ends of their upper flights are all mounted on a single shaft 340 for free rotation thereon, but the sprockets 338 at the remote or exit ends of the individual roller chains 336 are displaced longitudinally of the general direction of motion in a regularly ordered fashion, as clearly illustrated in FIGS. 10 and 11. The individual drive sprockets 339 for the respective roller chains 336 are all mounted on a common shaft 341 but are of different diameter, as shown in FIG. 11, the diameter ratios in the present structure being such that the length of the upper flight of each conveyor chain 336 is in direct proportion to its linear speed. Thus, a parallel row of bottles B simultaneously entering the entrance ends of the file conveyors 335 will arrive simultaneously at the exit ends thereof. The common drive shaft 341 for the file conveyors 335 is connected by a chain and suitable sprockets, as indicated at 342, to the shaft 211 of the drive unit 212 so that all of the file conveyors 335 move at a speed in excess of that of the previously described conveyor belt 201. Such increase in speed effects a definite separation of each row of bottles B from the next succeeding row even if the described row-aligning mechanism were not in operation.

A parallel row of bottles B released by the row-aligning mechanism will move across the transfer rollers 311, 312 and onto the individual article file conveyors 335, and through the differential speed of such conveyors, will arrive in longitudinally spaced relation at the exit end of the file conveyors at the same time for transfer thence to a single-file conveyor 350 in the form of a flat top conveyor chain whose upper flight extends angularly across the apparatus frame in immediate proximity to the termination of the upper flights of the respective file conveyors 335 and disposed in the same horizontal plane as the upper flights thereof. The flat-top conveyor 350 is trained about suitable supporting sprockets (not shown) at its extremities, such sprockets being mounted on shafts 351, 352, one of which is driven by connection to the drive shaft 341 of the file conveyors 335 by suitable pulleys and belts, as indicated at 353 in FIG. 11. The drive connection is such that the speed of the flat-top conveyor 350 is higher than that of the file conveyors 335 so that it can effect removal of a row of bottles B received from such file conveyors prior to the arrival of a subsequent row. A very high rate of article movement can be maintained since the angular transfer from each file conveyor 335 to the flat top chain 350 is not too sharp or abrupt.

Since the bottles B are received simultaneously by the flat top conveyor 350 and are laterally-spaced by the partitions 301, they are moved in single-file relation on the flat top conveyor without contact between adjacent bottles so that breakage on this high-speed conveyor is avoided. It should be observed however that the bottles B need not necessarily be delivered simultaneously to the flat top conveyor 350 in the manner specifically described to enable establishment of the non-contacting single-file relationship. It is merely necessary that the bottles B from the respective file conveyors 335 be received in timed relationship appropriate to the establishment of such single-file relationship.

As an individual bottle B moves from the end of a respective file conveyor 335, its forward portion first contacts the flat-top conveyor 350 and is consequently moved transversely to its previous direction of motion. If the bottle B is "flat," it will be turned and moved along the flat-top conveyor 350 with the flat sides of the bottle parallel to the new direction of motion. To insure such turning, a deflector finger 355 in the form of a pivotally-adjustable spring plate is secured to each of the partitions 301 adjacent its termination so as to project angularly into the respective guide channel at this point and engage the side of a bottle B during its transfer from the respective file conveyor 335 onto the flat top chain 350. Pivotal adjustment of such finger 335 will determine when the bottle B is released and can experience the described turning action.

An adjustable wall 356 is rigidly mounted at the side of the single-file, flat-top conveyor 350 remote from the exit ends of the file conveyors 335 to maintain the received bottles B on this conveyor and preferably a rope or other suitable cushion 357 is disposed on the inner surface of the wall to preclude breakage of any bottle thrown thereagainst during its transfer onto the single file conveyor from the parallel, file conveyors. Generally, the deflector fingers 355 described hereinabove will preclude such action but the precaution precludes breakage even though the fingers be adjusted improperly.

As a result of the described control of bottle transfer, the bottles B move on the flat-top single file conveyor 350 in aligned and oriented disposition and such disposition can be maintained through subsequent conveyor means employed to transfer the bottles to a filling station. After being filled and capped, the bottles B are reloaded into the empty cartons C for subsequent shipment, all in a known manner forming no part of the present invention.

*Operation*

A recapitulation of the entire carton unloading and article regimenting operation will be undertaken with additional reference to FIGS. 12 through 18, inclusive, which diagrammatically illustrate certain critical stages of the operation.

Initially, the apparatus must be adjusted to accommodate the particular carton C and bottle B or other articles to be unloaded and regimented. In the manner described in detail in the preceding description, the belts 102, 102' of the first conveyor 100, the guide rails 113, 113' and the plow-forming plates 127, 127' are adjusted in the flap opening section 30. In the unloading section 40, the arms 221, 221' are adjusted vertically and/or horizontally, as required for the particular size of carton C and in the regimenting section 50, the impeding means 320 and the deflector fingers 355 and wall 356 adjacent the single-file conveyor 350 are adjusted for proper accommodation of the bottles B or other articles. The carton C with the "flat" bottles B, as shown in FIG. 1 are chosen for exemplary purposes since they are the most difficult to handle when a high rate of operation is to be obtained. These "flat" bottles B are light so that they bounce or turn easily, have a relatively narrow base so as to be relatively unsteady, and finally, are quite frangible. In short, any apparatus capable of handling this type of bottle B will obviously handle with greater ease a cylindrical or square bottle, can or other article of similar regular configuration.

After the adjustments have been completed, the operator throws the main switch for the variable speed drive unit 212 which simultaneously instigates correlated movement of the various conveyors of the apparatus. Thereafter, dependent on the rated capacity of the filling machine to which the bottles are to be delivered, the speed of the unit 212 is varied so that the desired discharge of bottles B from the apparatus is obtained. Generally, such output will range between 150 and 300 bottles per minute.

The operator may now commence feeding of inverted cartons C to the entrance end of the apparatus. The operator may merely grasp an individual carton C, invert the same if necessary, and push it over the roller 112 at the entrance end of the machine onto the first conveyor 100 whereupon the carton will be engaged and propelled throughout its entire traverse of the machine. Alternatively, for added convenience to the operator, a gravity-feed conveyor (not shown) can be placed ahead of the entrance end of the apparatus so that the operator need merely place the cartons C in inverted juxtaposition on such conveyor and they will be fed one by one by gravity to the entrance end of the apparatus.

Regardless of the precise manner of feeding the apparatus, a carton C delivered over the roller 112 will be propelled by the first V-shaped conveyor 100 as soon as its weight rests thereupon. As long as a portion of the carton C remains upon the entrance roller 112, its desired horizontal disposition will be maintained thereby, and furthermore the side flaps F3, F4 will be maintained in their closed positions. After the carton C has moved entirely onto the V-shaped conveyor 100, its horizontal disposition is maintained by its edge supporting contact with the frictional belts 102, 102' of the conveyor but this same frictional contact exerts a force on the side flaps F3, F4 to swing the same into partially opened disposition in the manner clearly illustrated in the first diagrammatic view, FIG. 12, which is a transverse sectional view looking in the direction of carton movement on the first conveyor 100.

Figure 12:
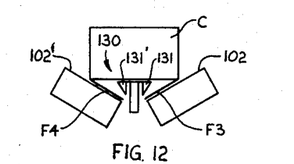

In FIG. 12, the pointed and depressed end of the flap-opening plow 130 and the flap diverting elements 131, 131' are clearly shown as disposed below the undersurface of the main body of the carton C but above the partially opened side flaps F3, F4. Thus, it will be clear that as the carton C passes from the first conveyor 100 onto the second conveyor 120, the side flaps F3, F4 are maintained in their partially-opened disposition but support is transferred from the outer edges of the carton on the first conveyor 100 to the central undersurface of the carton on the second conveyor 120. It should be additionally noted that if the end flaps F1, F2 are depressed slightly by the weight of the bottles B during movement along the first V-shaped conveyor 100, the depressed pointed end of the plow 130 will serve to engage and return the end flaps F1, F2 and the bottles B thereon upwardly to their original disposition relative to the carton C, as the latter moves onto the second conveyor 120.

Figure 13:
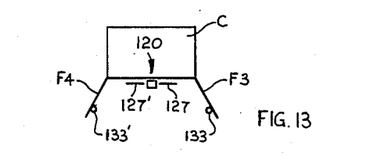

After the carton C has been moved by the second conveyor 120 a distance sufficient to free its partially opened side flaps from engagement with the V-shaped first conveyor 100, the leading portions of the side flaps F3, F4 are engaged by the helical flap-opening rods 133, 133' which thereafter effect the further opening of the side flaps, as illustrated in FIG. 13, which constitutes a transverse sectional view intermediate the length of the second conveyor 120. As movement of the carton C along the second conveyor 120 continues, the side flaps F3, F4 eventually are pushed outwardly and upwardly by the helical rods 133, 133' to horizontally-extended dispositions.

Figure 14A:
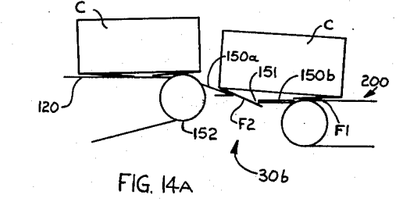
Figure 14B:
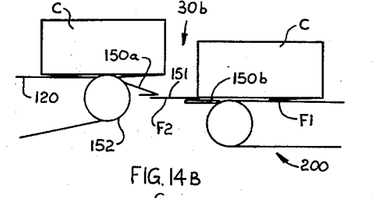

Once such horizontally-extended disposition of the side flaps F3, F4 has been obtained, the forward portion of the carton C moves onto the friction rollers 152, 152' and since these are slightly larger in diameter than the forward sprocket 124 of the second conveyor 120, this leading portion of the carton is lifted and thereafter advanced at a slightly higher rate of speed. As most clearly shown in FIG. 14a, which is a diagrammatic, longitudinal sectional view of the end flap opening portion 30b of the apparatus, such accelerated motion of each carton C results in its separation from the successive carton as the same moves over the rollers 152, 152' and onto the end-flap opening portion 30b of the apparatus. As the carton C moves downwardly along the initial sloping section 150a of the end-flap opening portion 30b, the leading end flap F1 merely passes over the slot 151 therein, but the trailing end flap F2 enters such slot as the carton passes thereover, as illustrated clearly in FIG. 14a. The end flap F2 is engaged by the remote slot-defining edge of the flat plate section 150b and is turned thereby into a fully opened disposition as shown in FIG. 14b which is similar to FIG. 14a but shows the carton C advanced onto the third conveyor 200. It will be noted that each carton C is engaged by the rollers 152 or the third conveyor 200 at all times so that continued propulsion over the end-flap opening portion 30b is obtained.

Figure 15:
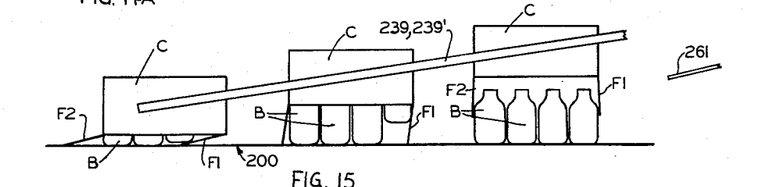

The carton C now moves along the surface of the third conveyor 200 with its side flaps F3, F4 and trailing end flap F2 opened until it is grasped on its sides by the elements of the carton take-off conveyor 220. As the carton C advances, it is now also lifted, as shown in FIG. 15 illustrating a series of cartons on such conveyor 220. The bottles B at the rearward portions of the carton C remain on the surface of the third conveyor 200 while those in the forward portions are retained by the leading end flap F1 which remains substantially closed during the initial lifting of the carton. As the carton C continues to rise, this leading end flap F1 gradually swings open, but for a substantial period of time retains the liner L within the carton, thereafter such liner being retained by the resilient grasping force of the carton take-off conveyor belts 239, 239' against the carton sides. As the leading end flap F1 gradually opens, the second row of bottles B is first able to emerge from the carton C, being guided by the opening end flap F1 into rearward engagement with the subsequent row of bottles B already resting on the third conveyor 200. Subsequently, the first row of bottles B likewise gradually emerges from the carton C, being guided between the opening end flap F1 and the second row of bottles B, wherefore ultimately all of the bottles are left on the belt conveyor 200 in aligned, oriented disposition. After all of the bottles have emerged and are being conveyed by the third conveyor 200 and the carton C continues to rise, its leading end flap F1 is engaged by the one rod section 261 of the carton discharge means 260, whereupon the leading end flap F1 is again swung to a closed position to assist in retention of the liner L within the carton.

As each carton C is pushed by succeeding cartons along the rod sections 261, 263, it is caused to pivot and is finally allowed to topple from the rod sections to one side of the apparatus in an upright disposition. A suitable loading station or conveyor (not shown) can be provided for the unloaded cartons C discharged from the apparatus in this manner.

As the parellel rows of unloaded bottles B move along the belt conveyor 200, they are almost immediately brought into contact with the projecting portions of 301c of the article-separating partitions 301 which serve to align the flat bottles B longitudinally and also to effect a slight lateral shifting thereof so that a predetermined lateral spacing is obtained.

Figure 16A:
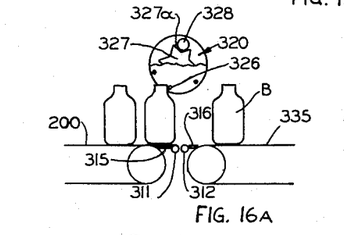
Figure 16B:
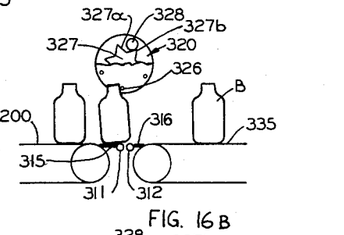

This orientation and longitudinal alignment of the bottles is maintained throughout their traverse of the row-aligning mechanism, whose operation is illustrated in FIGS. 16a, 16b and 16c in successive operational stages. As a bottle B or row of bottles reaches the end of the belt conveyor 200, its base portion moves onto the stationary rod 315 while its neck portion moves into engagement with one rod 326 of the superposed impeding means 320, such position being illustrated in FIG. 16a. In such initial position, the cam follower 328 is seated in an identation 327a of the star-shaped cam 327 wherefore a predetermined force is acting to restrain further movement of the engaged neck of the bottle B. However, the rearmost portion of the base of the bottle B is still in engagement with the belt conveyor 200 and is pushed forwardly until it moves off of the belt conveyor onto the stationary rod 315 whereupon no further propelling force is experienced. While the forward portion of the base of the bottle B has moved over the first transfer roller 311, the bottle is held at its neck so that it attains a rearwardly-tilted disposition, as shown in FIG. 16b, wherefore this forward portion of the bottle is raised above the transfer roller 311 and is not propelled thereby. Dependent upon the weight applied to the cam follower 328, and the propelling force applied to the bottle B before it comes onto the stationary rod 315, the impeding rod 326 may be shifted forward slightly as illustrated in FIG. 16b from its original disposition as shown in FIG. 16a, but the weight 331 on the cam follower bar 329 is carefully adjusted so that this forward movement will not be sufficient to either release the bottle B or permit its forward portion to come in contact with the transfer roller 311 without additional forces being applied thereto.

Figure 16C:
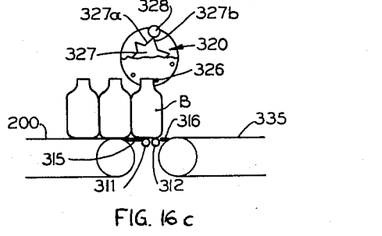

The additional propelling force necessary to overcome the impeding force is derived from engagement of the impeded bottle B by subsequent bottles moving along the belt conveyor 200. A successive bottle B coming in contact with the impeded bottle B will engage the shoulder portion thereof and exert thereagainst a predetermined propelling force tending to push the impeded bottle forwardly against the impeding rod 326. A second succeeding bottle coming into contact with the first bottle will add additional propelling force and so on until finally the propelling force is sufficient to urge the impeding rod 326 forwardly whereupon the cam follower 328 climbs from the indentation 327a of the star-shaped cam 327 and eventually reaches the high point 327b thereof, as illustrated in FIG. 16c. As soon as the cam follower 328 passes such high point 327b, its weight urges the star-shaped cam 327 in a counterclockwise direction, as viewed in FIG. 16c to immediately urge the impeding rod 326 forwardly and upwardly along an arcuate path out of its bottle impeding disposition. In the meantime, the successive rod 326 has taken its place in front of the neck of the next succeeding bottle B and the impeding cycle is repeated with respect thereto.

As mentioned previously, the weight 331 is normally adjusted on the cam follower bar 329 so that two rows of bottles B must arrive behind the impeded row in order to overcome the impeding force and permit the release of the first row of laterally-aligned bottles for movement over the transfer rollers 311, 312 and onto the individual file conveyors 335.

Figure 17:
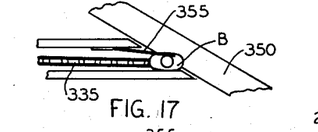
Figure 18:
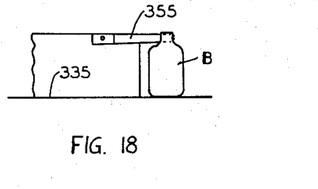

The released and aligned bottles B move along the individual file conveyors 335 in timed relationship so as to arrive at the displaced exit ends thereof at substantially the same time whereupon they can be transferred onto the single-file conveyor 350 simultaneously and in spaced relation for subsequent delivery to the filling machine. In order to control the transfer of the bottles B from the file conveyors 335 to the single-file discharge conveyor 350, the spring-deflector finger 355 at the exit end of the file conveyors is arranged preferably as shown in FIGS. 17 and 18 to engage the neck portion of the bottle B which provides for movement of the forward portion of the bottle onto the single-file conveyor a predetermined distance before the transverse motion of this conveyor engaging with this forward portion of the bottle effects turning thereof. When the deflector finger 355 is adjusted substantially as shown in FIGS. 17 and 18, the bottle B moves out onto the single-file conveyor 350 and is turned so as to align itself along such conveyor and moves substantially down the center thereof.

It has been mentioned that the apparatus is initially adjusted to handle the particular carton C and bottles B and after such initial adjustment, fine readjustments of particularly the row-aligning mechanism and the deflector finger 355, whose operation was just described are made during operation, to assure optimum operation. If the rate of operation of the apparatus is varied, adjustment also may be required.

Various alterations and/or modifications can obviously be made in the preferred form of apparatus shown and described without departing from the spirit of the invention, wherefore it is to be considered as purely exemplary and not in a limiting sense. The scope of the invention is to be indicated by reference to the appended claims.

What is claimed is:

1. A carton flap opener which comprises a first carton conveyor for frictionally propelling a carton including a pair of endless belts having their upper flights extending along parallel paths on opposite sides of a central plane, each belt flight being transversely disposed to diverge upwardly from the central plane whereby an inverted carton can be supported with its side edges resting on said belts yet the side flaps of the carton can swing to a partially open position, a side-flap opening plow disposed beyond said first conveyor to spread the side-flaps of a carton presented thereto from said first conveyor, said plow including a pair of flat plates disposed on opposite sides of the central plane and each of which tapers substantially to a point adjacent the end of said first conveyor and a flap-deflecting element secured to each plate and extending along a helical path therefrom, and a second conveyor having a flight disposed in the defined central plane between said spaced plates to engage centrally an inverted carton from said first conveyor to frictionally propel the same longitudinally of said flap-opening plow.

2. A carton flap opener according to claim 1 wherein said flat plates are mounted for lateral adjustment relative to said second conveyor.

3. A carton flap opener according to claim 1 which comprises a third conveyor aligned with said second conveyor but spaced a predetermined distance therefrom in the direction of carton movement, an end-flap opening portion disposed between said second and third conveyors and including a plate having a lateral slot thereacross to receive and effect opening of the rearmost end flap of a carton transferred from said second conveyor to said third conveyor.

4. A carton flap opener according to claim 3 wherein said third conveyor is at a lower level than said second conveyor and said plate slopes downwardly in the direction of carton movement thereacross.

5. A carton flap opener according to claim 3 which comprises means operatively associated with said second conveyor including friction rollers adapted to engage a carton at the end of said second conveyor and propel the carton at an increased rate of speed.

6. A carton flap opener which comprises a first conveyor for moving a carton in inverted position along a predetermined path, a second conveyor aligned with said path, spaced from said first conveyor in the direction of carton movement and disposed at a level beneath that of said first conveyor, and a stationary plate disposed between said conveyors to slope downwardly from the exit end of said first conveyor toward the entrance end of said second conveyor and having a lateral slot thereacross to receive the rearmost flap of a carton passing thereover.

7. A carton flap opener according to claim 6 wherein that portion of said plate between said lateral slot and said second conveyor lies substantially in the plane defined by the upper surface of said second conveyor.

8. A carton unloader which comprises a side-flap opening portion including conveyor means for moving a carton in inverted position along a predetermined path, a second substantially horizontal conveyor aligned with said path and spaced from said first conveyor in the direction of carton movement, an end-flap opening portion disposed between said conveyors for opening the rearmost end flap of a carton, and a carton take-off conveyor for grasping an inverted carton supported on the entrance end of said second conveyor and frictionally conveying the grasped carton along an upwardly inclined path while maintaining its inverted disposition whereby articles in the inverted carton are permitted to gradually emerge from the carton as it rises and remain on said second conveyor for conveyance thereon.

9. A carton unloader which comprises a substantially horizontal belt conveyor adapted to receive and support an inverted carton at its entrance end, a pair of parallel arms supported above the entrance end of said belt conveyor to project angularly upwardly along the respective opposite edges of said belt conveyor, a pair of pulleys supported at opposite ends of each arm for rotation in a plane substantially as defined by said pair of arms, an endless belt trained about each pair of pulleys, a plurality of idler pulleys disposed between the inner and outer flights of each endless belt, and spring means urging each of said idler pulleys against the inner flight of each belt whereby the two inner flights of said endless belts are adapted to resiliently engage opposite sides of a carton disposed therebetween and carry the carton in its inverted disposition with its undersurface remaining horizontal.

10. A carton unloader according to claim 9 which comprises a pulley supported adjacent to and for rotation with each pulley on each arm adjacent the entrance end of said belt conveyor, said adjacent pulleys being of substantially equal diameters so as to simultaneously engage the side of a carton at the entrance end of said belt conveyor.

11. A carton unloader according to claim 10 which comprises means for adjusting said pair of arms laterally and vertically relative to said belt conveyor whereby cartons of variant height and width can be accommodated.

12. A carton unloader according to claim 11 which comprises a single piece of rod having its opposite ends supported from the free projecting ends of said parallel arms and forming two rod sections projecting from said arms in twisting paths whereby a carton moved along said rod sections will be turned through a right angle laterally as it advances therealong.

13. A carton unloader and article regimenter which comprises a substantially horizontal belt conveyor adapted to receive and support an inverted carton with articles therein at its entrance end, said belt conveyor being formed of material so as to present only a small amount of frictional resistance to movement of an article thereacross, a carton take-off conveyor disposed above said belt conveyor and inclined upwardly from the entrance end of said belt conveyor and adapted to grasp a carton at the entrance end of said belt conveyor and convey the same in its inverted disposition with its undersurface remaining horizontal along an upwardly inclined path whereby the articles in the carton can emerge therefrom vertically and be carried on said belt conveyor as a plurality of successive substantially parallel rows, a plurality of article-separating partitions projecting in substantial parallelism longitudinally of said belt conveyor over its exit end to align successive articles in a plurality of parallel files while maintaining their row relationship, second conveyor means adapted to receive successively rows of articles from said belt conveyor and movable at a speed in excess of that of said belt conveyor whereby successive rows are separated one from the other, and third conveyor means disposed transversely of said second conveyor means to receive each row of articles and move the same in regimented single-file relation.

14. A carton unloader and article regimenter according to claim 13 which comprises a row aligning mechanism for transversely aligning each row of articles on said belt conveyor.

15. A carton unloader and article regimenter according to claim 13 which comprises means for conveying inverted cartons successively to the entrance end of said belt conveyor, and means associated with said carton conveying means for opening the flaps of each carton.

References Cited by the Examiner
UNITED STATES PATENTS

| | | | |
|---|---|---|---|
| 1,454,051 | 5/23 | Hevlings | 214—311 |
| 2,122,272 | 6/38 | Altmayer | 214—311 |
| 2,279,573 | 4/42 | Lang | 198—34 |
| 2,323,852 | 7/43 | Seidel et al. | 214—304 |
| 2,353,736 | 7/44 | Le Frank | 214—311 X |
| 2,597,387 | 5/52 | Seidel et al. | 214—304 |
| 2,648,450 | 8/53 | Neal | 214—304 |
| 2,683,560 | 7/54 | Keller | 214—304 X |
| 2,690,850 | 10/54 | Welker | 214—152 |
| 2,741,379 | 4/56 | Stryker | 214—152 |
| 2,744,611 | 5/56 | Jenney et al. | 198—32 |
| 2,791,315 | 5/57 | Chapman | 198—32 |
| 2,815,140 | 12/57 | Dice | 214—304 |
| 2,935,215 | 5/60 | Rose | 214—304 |

HUGO O. SCHULZ, *Primary Examiner.*

ERNEST A. FALLER, Jr., MORRIS TEMIN,
*Examiners.*